Sept. 5, 1950   H. J. GRAHAM   2,520,926
POWER SUPPLY FOR WELDING APPARATUS
Filed Sept. 13, 1947
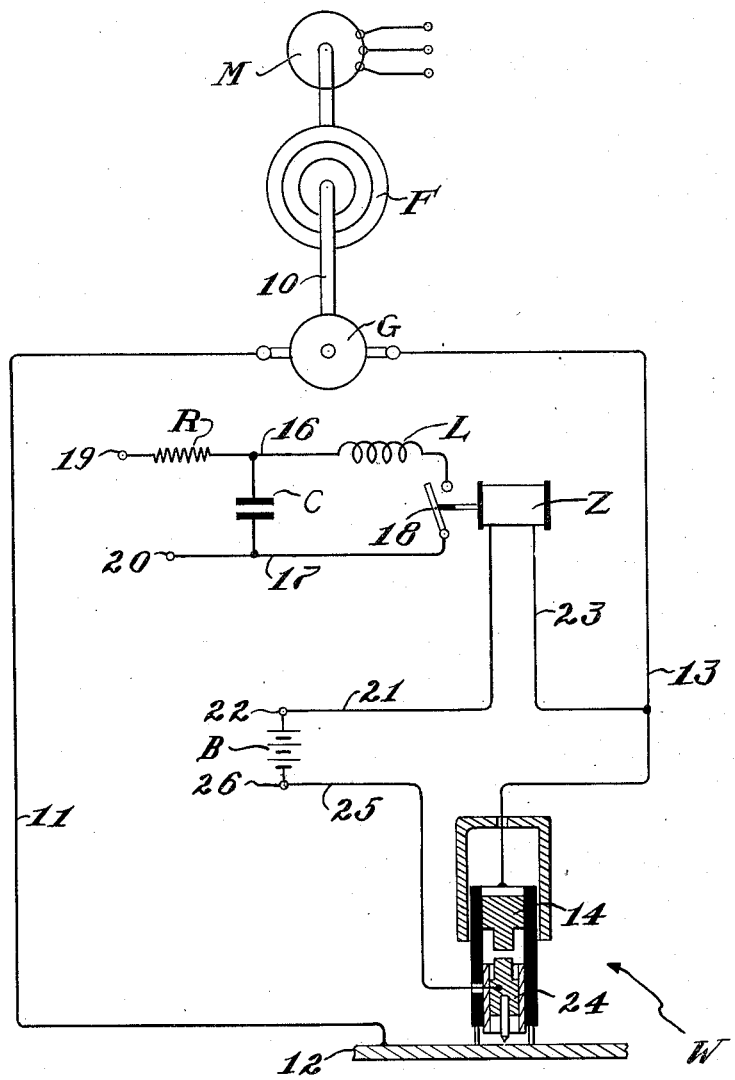
Inventor
Harold J. Graham
by Roberts, Cushman & Grover
Atty's Patented Sept. 5, 1950

2,520,926

UNITED STATES PATENT OFFICE 2,520,926

POWER SUPPLY FOR WELDING APPARATUS

Harold J. Graham, Boston, Mass., assignor, by mesne assignments, to Graham Manufacturing Corporation, Detroit, Mich., a corporation of Michigan Application September 13, 1947, Serial No. 773,881

6 Claims. (Cl. 219—4)

1

This invention relates to electric generating and control systems and more particularly to a novel electric generating and control circuit for use in welding systems to generate and control the application of the welding current impulse to a percussion welding tool.

The principal object of this invention is to provide an improved electrical generating and control circuit for supplying intermittent surges of welding current properly correlated with the operation of a percussion welding tool, the welding current having the desirable steep wave front characteristics such as would be obtained by discharge of a condenser while further having the power characteristics such as would be obtained from a heavy duty generator, the entire electrical control and generating system being energized from conventional line voltage sources without presenting excessive loading to the line voltage sources during the initial current surges.

The electrical generating and control system of this invention is especially adapted to supply intermittent surges of welding current impulses to a percussion welding tool in properly timed relation to the operation of the welding tool. A typical example of a percussion welding tool is described in my copending patent application Ser. No. 700,136 filed September 28, 1946, now Patent No. 2,510,101, dated June 6, 1950.

In one form of the present invention a motor generator set may be used to supply the direct current at an appropriate value for welding. The output of the generator is connected across the work and welding electrode such that, when the generator is energized, welding current impulses are supplied to the work. In the novel generating and control system of this invention, the generator field is normally de-energized so that normally there is no potential across the work and welding electrode and no welding current can flow. In the operation of the conventional percussive welding tool, a metallic hammer is adapted to strike the welding electrode against the work. The circuit of this invention is so arranged that the contact of the metallic hammer with the welding electrode is effective to complete an electric circuit and momentarily to energize the generator field so that a welding current of desirable wave form characteristics is then applied to the welding electrode and work. In order to provide the steep wave front or initial current surge characteristic for the welding current impulse from the generator upon closure of the circuit between the hammer and welding electrode, an impulse

2 of exciting electrical energy having initial surge characteristics is supplied to the generator field. Suitable electrical energy storage devices such as condensers may be used to be discharged and supply the field exciting current for the generator having the desirable characteristics.

Other objects and advantages of the invention will be apparent with reference to the following specification and drawing in which the single figure is a wiring diagram of the control circuit associated with a percussive welding tool also diagrammatically shown.

As shown in the drawing, the motor M is adapted to be connected to a line source of three phase alternating current to be energized thereby. Other types of electric motors may be used in place of the three phase motor shown. The motor M drives the shaft 10, flywheel F and generator G. One output terminal of the generator is connected by line 11 to the metal workpiece 12. The other output terminal of the generator G is connected by line 13 to the metal hammer 14 of the percussion welding tool 15. The field coil L of the generator G is connected by lines 16 and 17 through the normally open switch 18 to the opposite terminals of an energy storage device such as the condenser C. The condenser C or other form of electrical energy storage device is also connected across the terminals 19 and 20 of a suitable source of current to be continuously charged thereby through a current limiting resistance R.

The normally open switch 18 is provided with a relay operating coil Z, which is connected by line 21 to terminal 22 of a low voltage source of electrical energy such as a battery B or an analogously effective voltage source. The other terminal of the relay coil Z is connected by line 23 to line 13 and the welding tool hammer 14. The welding electrode 24 of the percussion welding tool 15 is connected by line 25 to the other terminal 26 of the low voltage line source of electrical energy.

In the operation of the generating and control system as described, the motor M is energized to thereby rotate the flywheel F and generator G. Since the generator field coil L is de-energized through the normally open switch 18, there is normally no potential generated and applied across the work 12 and welding tool 15. When the percussion welding tool 15 is brought into position with the work and the hammer 14 is caused to strike the welding electrode 24, a circuit is completed from terminal 22 through line 21, relay coil Z, lines 23 and 13, metal hammer 14, welding electrode 24 and line 25 to terminal 26 to energize the relay coil Z and close the normally open switch 18. The closure of switch 18 completes the circuit for connecting the generator field L across the condenser C and causes the discharge of the previously charged condenser C into the generator field L. The initial discharge of the condenser C causes an initial surge of generator exciting current to be passed through the generator field L. The generator G therefore produces an initial surge of welding current to be applied as a welding current impulse having the desirable steep wave front characteristics similar to the discharge wave form of the condenser C. The electrical resistance of the generator field coil L is very low and the condenser C is in effect short circuited so long as the switch 18 is closed. At the same time the current limiting resistance R is effective to prevent any substantial excitation of the generator field coil L from the potential across terminals 19 and 20. Therefore, after the condenser C is discharged, there is no further flow of welding current from the generator G.

It is desirable, although not necessary, to provide the flywheel F in order to stabilize the rotation of the generator G which ordinarily would present a heavy load to the motor M when the generator is initially excited with a surge of exciting current as obtained from the energy storage device C. It will be seen that the relay circuit including the normally open switch 18 prevents the application of welding current to the work 12 and percussion welding tool 15 until the hammer 14 strikes the welding electrode 24 and thus the generating circuit of this invention also functions as a control and safety circuit to assure de-energization of the welding apparatus at all times except during the times of actual usage.

It should be understood that the present disclosure is for the purpose of illustration only and that this invention includes all modifications and equivalents which fall within the scope of the appended claims.

I claim:

1. A generating and control system for supplying a current surge of initially high value, comprising a motor driven generator having a field coil and an armature, said armature supplying the load current, an energy storing capacitor adapted to be charged from a direct current power supply, and a normally open switch connected in series with said capacitor and said field coil, whereby the closing of said switch discharges the capacitor through the field coil resulting in a current surge of initially high value from the armature.

2. A generating and control system for supplying welding current to a percussion welding tool comprising a motor driven generator having a field coil and an armature, said armature being connected in series with the work and said welding tool, a capacitor adapted to be charged from a direct current power supply, and a normally open switch closed by the operation of said percussion tool to connect said capacitor in series with said field coil whereby the closing of said switch discharges the capacitor through the field coil so that the resulting current surge from the armature has a steep wave front.

3. A generator and control system for supplying welding current to a percussion welding tool comprising a motor driven generator having a field coil and an armature, said armature being connected in series with the work and the hammer of the percussion tool, a capacitor adapted to be charged from a direct current power supply, a normally open switch connected in series with said capacitor and said field coil, and a solenoid energized by the contacting of the hammer of the percussion tool with the welding electrode to close said switch whereby the closing of said switch discharges said capacitor through the field coil so that the resulting surge from said armature has a steep wave front.

4. A control system for a welding generator having a field coil and an armature, said armature supplying current to a workpiece through the hammer and the welding electrode of a percussion tool, comprising a direct current power supply, a capacitor charged from said power supply, a normally open switch connected in series with said capacitor and field coil, a solenoid for operating said switch, and a series circuit including said solenoid and said power supply completed by the contacting of said welding electrode by said hammer whereby the completion of the circuit discharges said capacitor through said field coil so that the resulting current surge from the armature has a steep wave front.

5. The generating and control system for supplying welding current to a percussion welding tool comprising, a generator having output terminals connected to the work and percussion welding tool, a field coil for said generator adapted to be connected to a source of exciting current, means to drive said generator, connecting means including a normally open switch to connect said field coil to a source of exciting current, electrical energy storage means adapted to be charged and in circuit with said connecting means to be discharged into said field coil upon closure of said switch, and means responsive to the operation of said percussion welding tool to close said switch and excite said generator field from the discharge of said energy storage means.

6. The generating and control system for supplying welding current to a percussion welding tool comprising, a generator having output terminals connected to the work and hammer of the percussion welding tool respectively, a field coil for said generator adapted to be connected to a source of exciting current, means to drive said generator, connecting means including a normally open switch to connect said field coil to a source of exciting current, electrical energy storage means adapted to be charged and in circuit with said connecting means to be discharged into said field coil upon closure of said switch, and relay means responsive to the contact of the hammer of the percussion welding tool with the welding electrode to close said switch and excite said generator field from the discharge of said energy storage means.

HAROLD J. GRAHAM.

REFERENCES CITED

The following references are of record in the file of this patent:

UNITED STATES PATENTS

| Number | Name | Date |
| --- | --- | --- |
| 1,061,375 | Heany | May 13, 1913 |